(12) United States Patent
Hicken et al.

(10) Patent No.: US 8,882,138 B1
(45) Date of Patent: Nov. 11, 2014

(54) CENTER AIRBAG

(71) Applicant: Autoliv ASP, Inc., Ogden, UT (US)

(72) Inventors: Paul Hicken, Syracuse, UT (US);
Xiaohong Wang, Roy, UT (US);
Takayuki Makioka, Roy, UT (US);
Hideaki Tanaka, South Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/226,391

(22) Filed: Mar. 26, 2014

(51) Int. Cl.
*B60R 21/16* (2006.01)

(52) U.S. Cl.
USPC .................................. 280/730.1; 280/730.2

(58) Field of Classification Search
CPC ...... B60R 21/20; B60R 21/21; B60R 21/205; B60R 21/206; B60R 21/207
USPC .................................. 280/730.1, 730.2, 732
See application file for complete search history.

(56) References Cited

U.S. PATENT DOCUMENTS

| | | | | |
|---|---|---|---|---|
| 3,588,140 A | * | 6/1971 | Chute | 280/730.1 |
| 4,948,168 A | * | 8/1990 | Adomeit et al. | 280/732 |
| 5,222,761 A | | 6/1993 | Kaji et al. | |
| 5,531,470 A | * | 7/1996 | Townsend | 280/730.2 |
| 5,575,497 A | * | 11/1996 | Suyama et al. | 280/730.1 |
| 5,630,616 A | * | 5/1997 | McPherson | 280/730.2 |
| 5,967,603 A | * | 10/1999 | Genders et al. | 297/216.13 |
| 6,029,993 A | * | 2/2000 | Mueller | 280/730.2 |
| 6,712,384 B2 | * | 3/2004 | Abe | 280/730.1 |
| 7,021,654 B2 | * | 4/2006 | Honda et al. | 280/730.2 |
| 7,441,837 B2 | * | 10/2008 | Fischer et al. | 297/216.1 |
| 7,717,459 B2 | | 5/2010 | Bostrom et al. | |
| 8,267,424 B2 | | 9/2012 | Tomitaka et al. | |
| 8,353,529 B2 | | 1/2013 | Tomitaka et al. | |
| 8,414,018 B2 | | 4/2013 | Choi et al. | |
| 2010/0078921 A1 | * | 4/2010 | Ryan et al. | 280/730.2 |
| 2014/0042733 A1 | * | 2/2014 | Fukawatase | 280/730.2 |
| 2014/0049028 A1 | * | 2/2014 | Schenten et al. | 280/730.1 |

FOREIGN PATENT DOCUMENTS

| | | |
|---|---|---|
| DE | 10038088 A1 | 2/2002 |
| DE | 102011112996 A1 | 4/2012 |
| EP | 1885582 B1 | 4/2009 |
| JP | 2992961 B2 | 10/1999 |
| JP | 2010115947 A | 5/2010 |
| JP | 2010143233 A | 7/2010 |
| JP | 2011051512 A | 3/2011 |
| KR | 1020050029833 A | 3/2005 |

\* cited by examiner

*Primary Examiner* — Faye M. Fleming
(74) *Attorney, Agent, or Firm* — R. Whitney Johnson; Stoel Rives LLP

(57) ABSTRACT

An airbag assembly may include an airbag cushion that can be deployed to cover a portion of the dashboard of a vehicle adjacent another portion of the dashboard that is covered by a deployed front airbag. In some embodiments, airbag cushions may be housed beneath a seating surface of an occupant and deploy inboard of the housing to cover a portion of the dashboard. Such airbags may provide increased protection to front seat occupants who move in an oblique direction, both forward and inboard, during a collision event.

18 Claims, 5 Drawing Sheets

CENTER AIRBAG

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
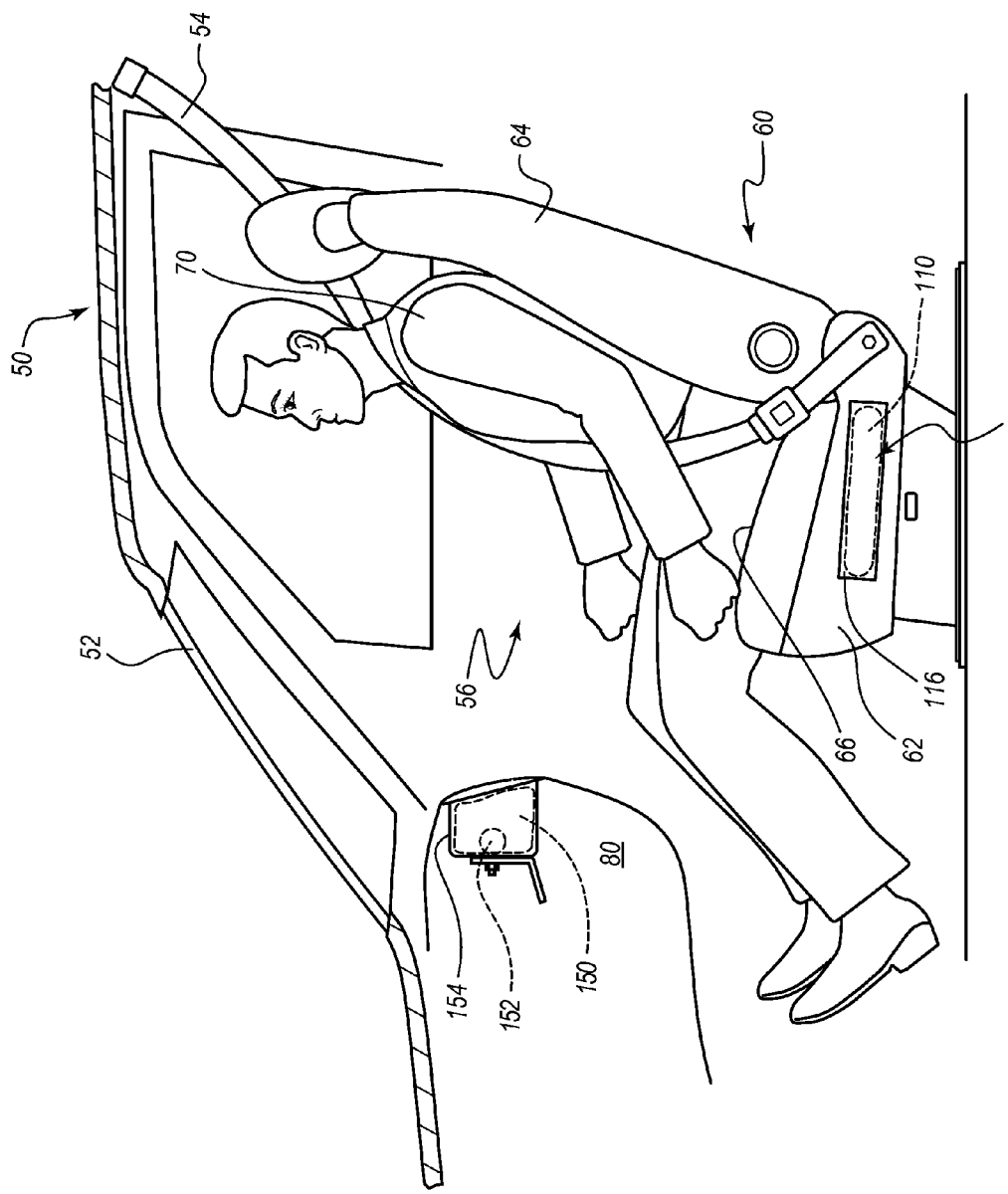
FIG. 1A is a cross-sectional side view of a vehicle depicting a center airbag, a passenger airbag, an occupant seated in a front passenger seat, and a dashboard, wherein the center airbag assembly and the passenger airbag are in an undeployed state.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware, an adhesive, or the like). The phrase "fluid communication" is used in its ordinary sense, and is broad enough to refer to arrangements in which a fluid (e.g., a gas or a liquid) can flow from one element to another element when the elements are in fluid communication with each other. The geometric center of an object (e.g., an airbag cushion) is the mean position of all points within the object. As used herein, a deployed airbag "covers" an object if at least a portion of the deployed airbag is disposed between the region typically occupied by a seated occupant and the object.

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. As used herein, the directional term "forward" is expressed in relation to the front of the vehicle. For example, an airbag cushion that deploys in a forward direction deploys toward the front of the vehicle. A front driver airbag is an airbag that, when deployed, is configured to cushion a driver's head as the driver moves in a generally forward direction during a collision event. Typically the front driver airbag is integrated into the steering wheel system. A front passenger airbag is an airbag that, when deployed, is configured to cushion the head of a person seated in the front passenger seat as the person moves in a primarily forward direction during a collision event. The term "front airbag" as used herein refers to a front driver airbag or a front passenger airbag. The plural form "front airbags" can include both a front driver airbag and a front passenger airbag.

Inflatable airbag systems may be installed at various locations within a vehicle to reduce or minimize occupant injury during a collision event. For example, among other locations, airbag modules have been installed in steering wheels and dashboards/instrument panels. In the following disclosure, specific reference is made to airbags to be deployed from a seat of a vehicle (e.g., airbags that are coupled, attached, and/or mounted to a seat frame), and more specifically airbags that are to be deployed from below a seating surface of a seat of a vehicle, although the principles discussed herein may apply to airbags that are disposed at and/or deployable from other locations within a vehicle.

Airbags are typically installed within a housing in a packaged state (e.g., rolled, folded, and/or otherwise compressed) and may be retained in the packaged state behind a cover. During a collision event, an inflator may be triggered, which rapidly fills the airbag with inflation gas. The inflation gas may cause the airbag to rapidly transition from a compact packaged (i.e., undeployed) state to an expanded or deployed state. In some embodiments, the expanding airbag opens an airbag cover (e.g., by tearing through a burst seam or opening a door-like structure) to exit the housing. The inflator may be triggered by any suitable device or system, and the triggering may be in response to and/or influenced by one or more vehicle sensors.

During a collision event, a front passenger airbag and a front driver airbag (i.e., front airbags) may each deploy primarily toward a corresponding vehicle occupant region (i.e., a region typically occupied by a seated occupant). The airbag cushions of the front airbags are typically configured to receive the torso and/or head of a passenger during a collision event in which the occupant travels primarily in a forward direction. In some instances, however, the front airbags may be too narrow to provide effective coverage for a front-seat occupant who has a forward and inboard trajectory (or oblique trajectory). For example, because some front airbags do not cover the entire surface of the instrument panel, an occupant with a forward and inboard trajectory (or oblique trajectory) may fail to engage with or slide off a front airbag, thereby striking a region of the instrument panel disposed adjacent the driver airbag and/or the passenger airbag (e.g., between front airbags).

Airbag assemblies that have an airbag cushion that is configured to cover a region of the dashboard that is otherwise not covered by a front airbag (e.g., a passenger airbag or a driver airbag) may thus provide increased protection to an occupant relative to vehicles with only front airbags, especially during collisions in which a front-seat occupant travels in both a forward and inboard direction (or oblique direction). For example, an airbag may be configured to deploy such that the deployed airbag is positioned between a front seat occupant and the dashboard, thereby covering the dashboard.

An occupant's forward and inboard trajectory may arise from frontal-impact collisions where the impact is not distributed uniformly across the front plane of the vehicle. Such collisions may be, for example, oblique vehicle-to-vehicle collisions (e.g., collisions in which, immediately prior to impact, the occupant's vehicle is travelling in a direction that is not substantially parallel to the other vehicle's direction of travel), co-linear vehicle-to-vehicle collisions (e.g., collisions where, immediately prior to impact, both vehicles are travelling in substantially parallel directions), or collisions with a stationary object.

Some embodiments disclosed herein can provide improved positioning, cushioning, and/or safety to occupants involved in particular types of collisions. For example, some embodiments can be particularly suited to cushion drivers and/or front-seat passengers seated adjacent a front door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the of the vehicle width, (5) collisions as specified for the Insurance Institute for Highway Safety (IIHS) small overlap frontal crash test, and (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II), (December 2012) and Saunders, J., Craig, M., and Parent, D., Moving Deformable Barrier Test Procedure for Evaluating Small Overlap/Oblique Crashes, SAE Int. J. Commer. Veh. 5(1):172-195 (2012).

In some airbag assemblies disclosed herein, the airbag housing may be coupled to (e.g., attached to or mounted to) a seat of a vehicle. For example, in some embodiments, the housing for the airbag is attached to or integrated with a seat base frame such that the airbag may deploy inboard from the housing and cover a portion of the dashboard that is not covered by a deployed front airbag. In some embodiments, attaching the airbag housing to a seat (or integrating the airbag housing within the seat) provides room to mount a larger inflator than the inflators that may be used in other locations of the vehicle (e.g., the dashboard). Additionally, in some embodiments, a deployed airbag that covers a generally central region of the dashboard may provide protection to a driver during collisions in which the driver moves in an oblique direction both forward and inboard. In some embodiments, a deployed airbag that covers a generally central region of the dashboard may provide protection to a passenger during collisions in which the passenger moves in an oblique direction both forward and inboard. Other advantages of various embodiments will be evident from the present disclosure.

Figure 1B:
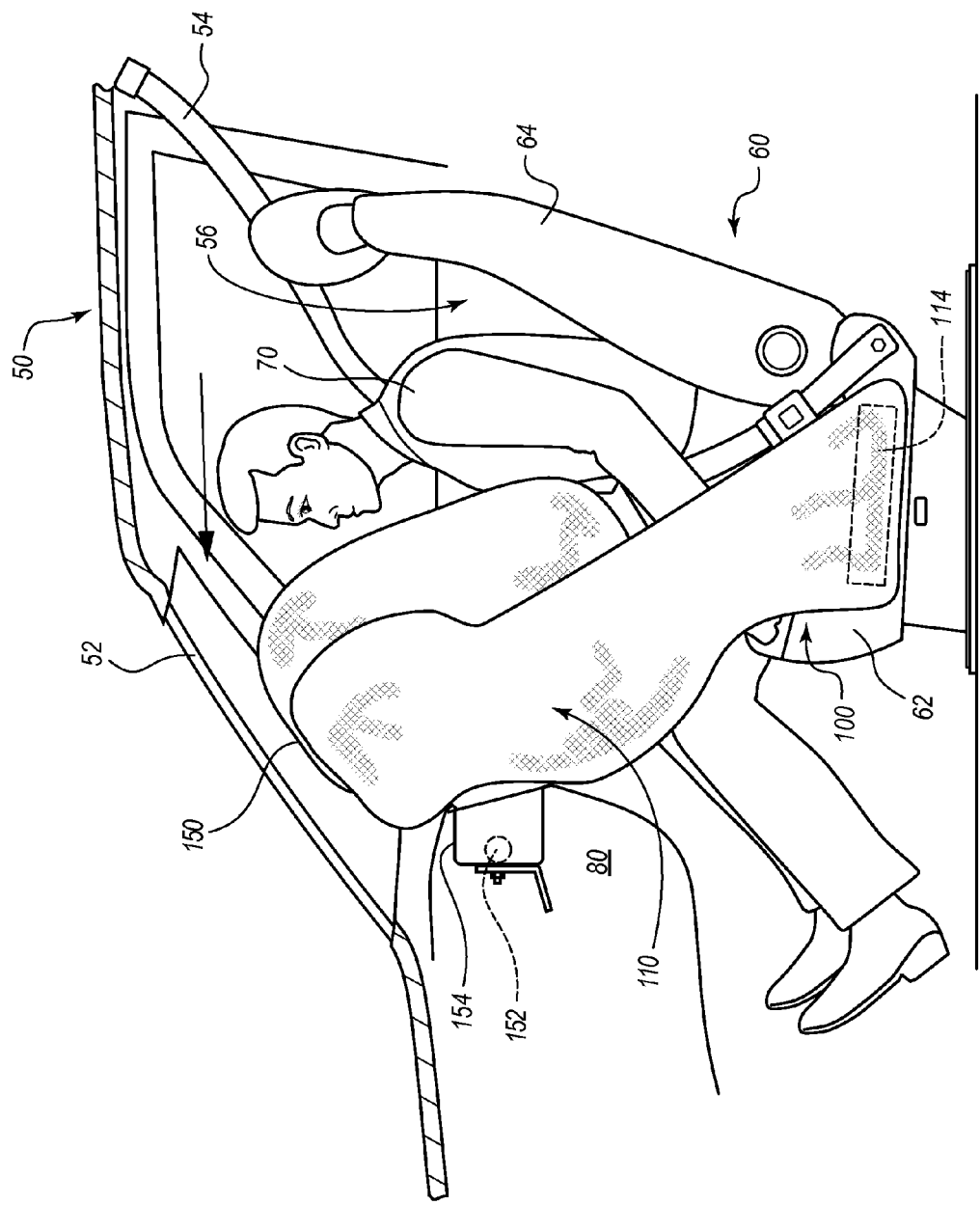
FIG. 1B is a cross-sectional side view of the vehicle of FIG. 1A, wherein the center airbag and the passenger airbag are in a deployed state.

FIGS. 1A and 1B provide cross-sectional side views of a vehicle 50 in which a front passenger airbag 150 and an airbag cushion 110 of a center airbag assembly 100 are shown in an undeployed state and a deployed state, respectively. Although the center airbag assembly shown in FIGS. 1A and 1B is coupled to a passenger seat, the principles and features disclosed herein may be relevant to airbag assemblies that are coupled to driver seats. Stated otherwise, this disclosure includes airbag assemblies that deploy from adjacent a driver seat (e.g., airbag assemblies that are configured to deploy an airbag inboard of the driver seat). Additionally, as one of skill in the art with the benefit of this disclosure would understand, features of passenger seats may analogously apply to driver seats and features of passenger airbags may analogously apply to driver airbags.

In FIGS. 1A and 1B, a vehicle occupant 70 is shown seated on a passenger seat 60 that is configured to fit a single person (e.g., a bucket seat). The depicted passenger seat 60 comprises a seat base 62 and a seat back 64. The seat base 62 may comprise a rigid frame and a seating surface 66 (see FIG. 2), which may be configured to contact the buttocks and/or the thighs of a seated occupant 70. The seat base 62 may be further configured to accommodate a center airbag assembly 100 in an undeployed state. The seat back 64 may extend generally upward from the seat base 62 and may be configured to support the head and/or back of the seated occupant 70. The seat 60 may provide a vehicle occupant region 56 within which the vehicle occupant 70 is generally positioned while in the seat 60.

As disclosed in FIGS. 1A and 1B, the vehicle 50 may further comprise an instrument panel 80. The instrument panel 80 may also be referred to herein as a dashboard. In many vehicles 50, a central region of the instrument panel 80 can include a stack of various buttons, controls, and other user interfaces. For example, the central region, which may commonly be referred to as a center console, a center stack, or an IP stack 81 (see FIG. 2), can include one or more of a screen (such as for navigation, backup camera display, etc.), radio and/or other media controls, climate controls, etc.

The front passenger airbag 150 may be coupled to the instrument panel 80 of a vehicle 50. For example, as shown in FIG. 1A, prior to deployment, the front passenger airbag 150 may be positioned within the instrument panel 80. In some embodiments, the undeployed front passenger airbag 150 is disposed within a housing 154 that may be mounted within the instrument panel 80. An inflator 152 may be coupled to both the housing 154 and the front passenger airbag 150 such that, during a deployment event, the inflator 152 fills the passenger airbag 150 with gas, thereby causing the front passenger airbag 150 to emerge from the instrument panel 80 (see FIG. 1B). The front passenger airbag 150 may be configured to deploy directly in front of and/or toward the vehicle occupant region 56. Stated otherwise, in some instances, the front passenger airbag 150 may follow a trajectory that is not in a straight line toward the vehicle occupant region 56, such as by expanding upwardly toward a windshield 52 of the vehicle 50 and/or downwardly toward a floor of the vehicle 50. However, deployment of the front passenger airbag 150 may nevertheless be generally rearward toward the vehicle occupant region 56. The deployed front passenger airbag 150 may be configured to cushion the head and/or torso of a passenger 70 who moves directly and/or primarily forward during a collision event.

Although not shown in FIGS. 1A and 1B, the vehicle 50 may also comprise a driver seat, a steering wheel, and a front driver airbag disposed within the steering wheel. Like the front passenger airbag 150 described above, the front driver airbag may deploy during a collision event directly in front of and/or toward the vehicle occupant region of the driver seat. The deployed front driver airbag may be configured to cushion the head and/or torso of a driver who moves directly and/or primarily forward during a collision event.

In addition to illustrating the front passenger airbag 150, FIGS. 1A and 1B also depict a center airbag assembly 100. The center airbag assembly 100 may comprise an airbag cushion 110, a housing 114, and an inflator 112 (see FIG. 2). In some embodiments, the center airbag assembly 100 and/or components thereof are coupled to a front seat in a vehicle (e.g., a bucket seat disposed in a front cabin of a vehicle). For example, a housing 114 that is configured to house an undeployed airbag cushion 110 may be coupled to the seat base 62. More particularly, in some embodiments, the housing 114 is attached and/or mounted to a rigid (e.g., steel) frame of the seat base 62. In some embodiments, the housing 114 is coupled to the seat base 62 such that the packaged airbag cushion 110 is disposed entirely within the seat base 62. In other embodiments, the housing 114 is coupled to the vehicle at or below a seating surface 66 (see FIG. 2) of the seat base 62. An inflator 112 (see FIG. 2) may be coupled to the housing 114 and may be in fluid communication with the airbag cushion 110 such that, during a deployment event, the inflator 112 fills the airbag cushion 110 with gas, thereby causing the airbag cushion 110 to emerge from the seat base 62.

The airbag cushion 110 of the center airbag assembly 100 may be configured to receive inflation gas from the inflator 112 to expand the airbag cushion 110 from a compact state to a deployed (i.e., expanded) state. For example, upon deployment, air from the inflator 112 may enter into the airbag cushion 110 causing the airbag cushion 110 to expand and exit from within the seat base 62 toward the center of the vehicle 50, and more particularly forward and inward of the occupant region 56. The center airbag assembly 100 may include a cover 116 of any suitable variety, and may include a tear seam or burst seam through which the airbag cushion 110 may deploy. The airbag cushion 110 may be shaped and dimensioned such that the airbag cushion 110, when fully deployed, covers a portion or region of the dashboard 80. For example, in some embodiments, the airbag cushion 110 may be configured to cover the IP stack region 81 (see FIG. 2) of the dashboard 80, which may not be covered by a front airbag when one or more front airbags are in a deployed state. Stated differently, the airbag cushion 110 may be configured to cover an inboard region of the dashboard 80 that is disposed lateral to an outboard region of the dashboard 80 that would be covered by a front airbag when the front airbag is deployed). In other words, the airbag cushion 110 may deploy to cover a portion of the dashboard adjacent a front airbag (e.g., the front passenger airbag 150) when the front airbag is in a fully deployed state. In some embodiments, an airbag cushion 110 may have a generally upward and forward trajectory during inflation.

In some embodiments, an airbag cushion 110 that is configured to cover a portion of the dashboard 80 and to deploy from adjacent a seat base 62 does not, when deployed, fill all of the space between an occupant seated in the passenger seat and an occupant seated in the driver seat. For example, as shown in FIG. 1B, the airbag cushion 110 may deploy in primarily a forward and upward direction such that space directly between the shoulders of a passenger and a driver is not occupied by the airbag cushion 110. The space between the passenger and the driver that is not occupied by the airbag cushion 110 may be described with greater specificity by reference to a crash test dummy, such as the THOR Advanced Crash Test Dummy (THOR crash test dummy), the Hybrid III Fiftieth Percentile Male crash test dummy (Hybrid III crash test dummy), or another crash test dummy designed consistent with specifications set forth by the NHTSA or similar regulatory and/or governing organization. The specifications of the two aforementioned crash test dummies are set forth in the THOR-NT User's Manual (Revision 2005.1, March 2005) and the User's Manual for the 50th Percentile Male Hybrid III Test Dummy (June 1998, Reaffirmed April 2005).

In some embodiments disclosed herein, the airbag cushion 110, when fully deployed, does not intersect a line segment that runs from the inboard shoulder of a crash test dummy (e.g., a THOR or a Hybrid III crash test dummy) that is seated in a driver seat in a vehicle occupant region to an inboard shoulder of another crash test dummy (e.g., a THOR or a Hybrid III crash test dummy) that is seated in a passenger seat in a vehicle occupant region. In other or further embodiments, the airbag cushion does not intersect with a line segment that runs from a thoracic vertebra of a crash test dummy (e.g., a THOR or a Hybrid III crash test dummy) that is seated in a driver seat in a vehicle occupant region to a thoracic vertebra of another crash test dummy (e.g., a THOR or a Hybrid III crash test dummy) that is seated in a passenger seat in a vehicle occupant region.

In operation, the center airbag assembly 100 can be deployed when the vehicle 50 is involved in a collision. For example, deployment may be triggered by one or more sensors that are coupled to the inflator 112. Triggering of one or more sensors may, at least in part, actuate the inflator 112, causing the inflator to fill the airbag cushion 110 with inflation gas. In some instances, one or more of a front passenger airbag 150 and a front driver airbag may be deployed contemporaneous to, or even simultaneous to (or nearly simultaneous to), the deployment of the airbag cushion 110. For example, the front passenger airbag 150 and the airbag cushion 110 may both deploy in response to the same external stimuli during a collision event.

In some embodiments, when the airbag cushion 110 and one or more front airbags are deployed during the same collision event, the deployed airbag cushions may interact to stabilize one another and/or facilitate proper positioning of one of more of the airbag cushions. For example, upon deployment of both the front passenger airbag 150 and the airbag cushion 110, the front passenger airbag 150 may be positioned directly in front of the occupant 70, and the airbag cushion 110 may be disposed lateral to (e.g., inboard of) the deployed passenger airbag 150. During deployment, the airbag cushion 110 may contact an inflated or partially inflated front airbag (e.g., the passenger airbag 150). Such contact may facilitate the proper positioning of the front airbag(s) and/or stabilize one or more of the front airbags (e.g., reduce rotation of the front passenger airbag 150 and/or the front driver airbag). Such contact may also facilitate proper positioning of the airbag cushion 110.

In some instances, when the vehicle 50 is involved in a collision that causes the occupant 70 to move primarily in a forward direction, or substantially exclusively in a forward direction, toward the dashboard 80, the passenger airbag 150 may receive the vehicle occupant 70 in a typical fashion. In other instances, the vehicle 50 can be involved in a collision that causes the occupant 70 to move in an oblique direction, both in a forward direction and in an inboard direction. The airbag cushion 110 may provide an additional cushioning region for the occupant 70 in such instances. For example, in some circumstances, the occupant 70 may miss the front passenger airbag 150 but may be received by the airbag cushion 110. In other or further circumstances, the front passenger airbag 150 may roll as the occupant 70 engages an inboard corner thereof such that the occupant 70 does not fully engage the front passenger airbag 150 and may then be received by the airbag cushion 110. In still other or further circumstances, the airbag cushion 110 may stabilize the front passenger airbag 150 to make the front passenger airbag 150 resistant to rolling or otherwise missing the occupant 70 as the occupant 70 travels in an oblique or angled forward/inboard direction. The airbag cushion 110 may perform an analogous role in connection with a front driver airbag.

Figure 2:
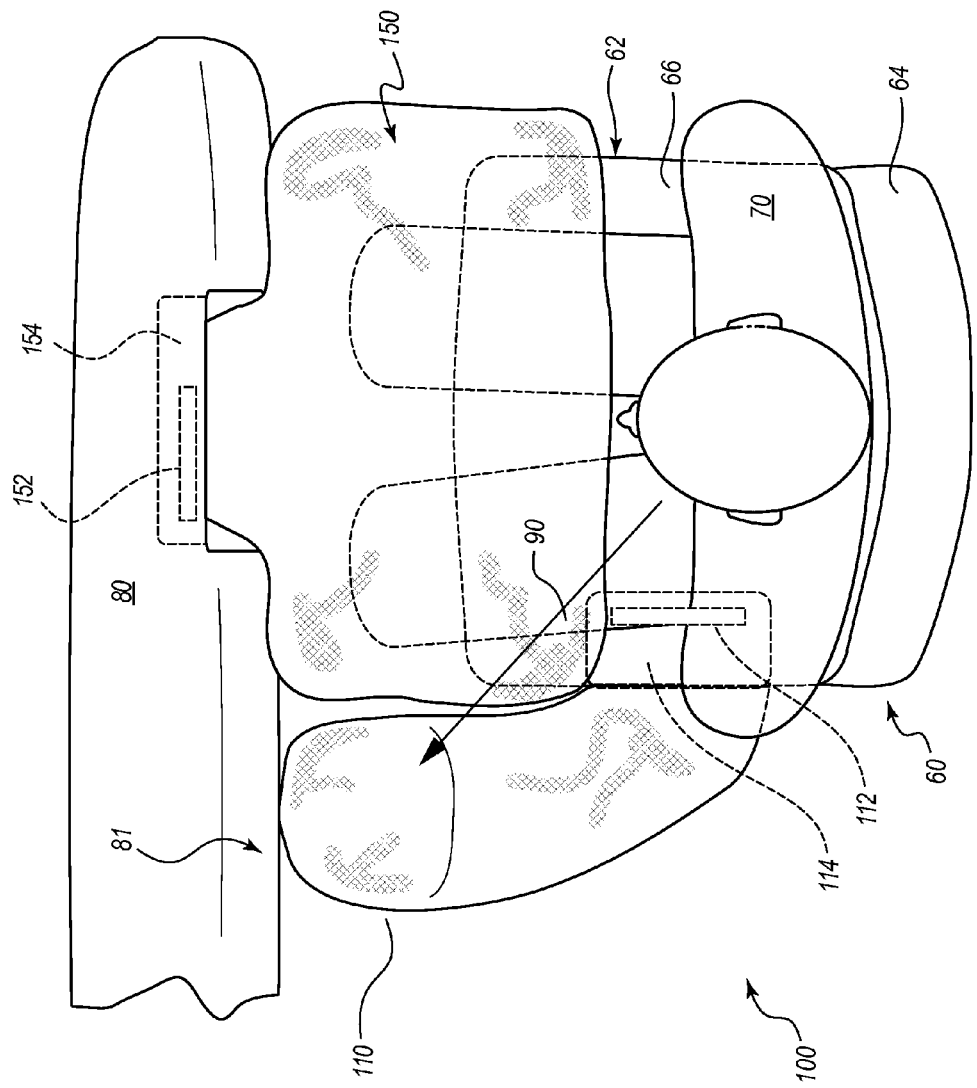
FIG. 2 is a top plan view of a portion of the vehicle of FIG. 1A, depicting a deployed center airbag, a deployed passenger airbag, and a vehicle occupant moving in an oblique direction both forward and inboard.

FIG. 2 provides a top plan view of portion of the vehicle shown in FIG. 1A, depicting a deployed airbag assembly 110, a deployed passenger airbag 150, and a vehicle occupant 70 moving in an oblique direction, both forward and inboard, such as that just described. During a collision event, the nature of the impact and/or the momentum of the occupant 70 may cause the occupant 70 to travel in an angled forward/inboard direction. An example of an angled direction, which may also be referred to as an oblique direction, is depicted by the arrow 90. In the illustrated embodiment, the passenger airbag 150 deploys from the instrument panel 80 toward an occupant 70 seated in front of the airbag housing 154. In this manner, the front passenger airbag 150 is prepared to receive the occupant 70, and would do so in a typical fashion if the vehicle occupant 70 were to move primarily in a forward direction (i.e., toward the front of the vehicle). However, the angled movement of the occupant 70 may prevent the occupant from adequately engaging with the front passenger air bag 150.

As shown in FIG. 2, when fully deployed, the airbag cushion 110 is disposed inboard of the front seat from which it emerges and extends toward the front of the vehicle 50 to cover and/or contact a portion of the dashboard or instrument panel 80. When positioned in this manner, the airbag cushion 110 may stabilize an adjacent front passenger airbag 150 and/or an adjacent front driver airbag. Additionally or alternatively, this arrangement may allow the airbag cushion 110 to receive the occupant 70 if the occupant 70 bypasses or is not fully stopped by a front airbag, such as in an oblique collision. The airbag cushion 110 may thus shield the occupant 70 from harmful contact with the dashboard 80, and in some instances, may be oriented in such a manner to shield the occupant 70 from harmful contact with the IP stack region 81 of the dashboard 80.

In other embodiments, an analogous airbag cushion may be configured to conform to a more rearward face of an IP stack that projects rearward relative to adjacent portions of the dashboard. In other words, a central portion of the dashboard may be disposed further rearward than other portions of the dashboard. The airbag cushion may be shaped and dimensioned so that, when fully deployed, the airbag cushion closely conforms and/or contacts the more rearward face of the central region of the dashboard.

The deployed airbag cushion 110 may receive the vehicle occupant 70 if the occupant 70 misses the passenger airbag 150. In other or further circumstances, passenger airbag 150 may roll as the occupant 70 engages an inboard corner thereof such that the occupant 70 does not fully engage the passenger airbag 150 and may then be received by the airbag cushion 110. In still other or further circumstances, the airbag cushion 110 may stabilize the passenger airbag 150 to make the passenger airbag 150 resistant to rolling or otherwise missing the occupant 70 as the occupant 70 travels in an oblique or angled forward/inboard direction.

Figure 3:
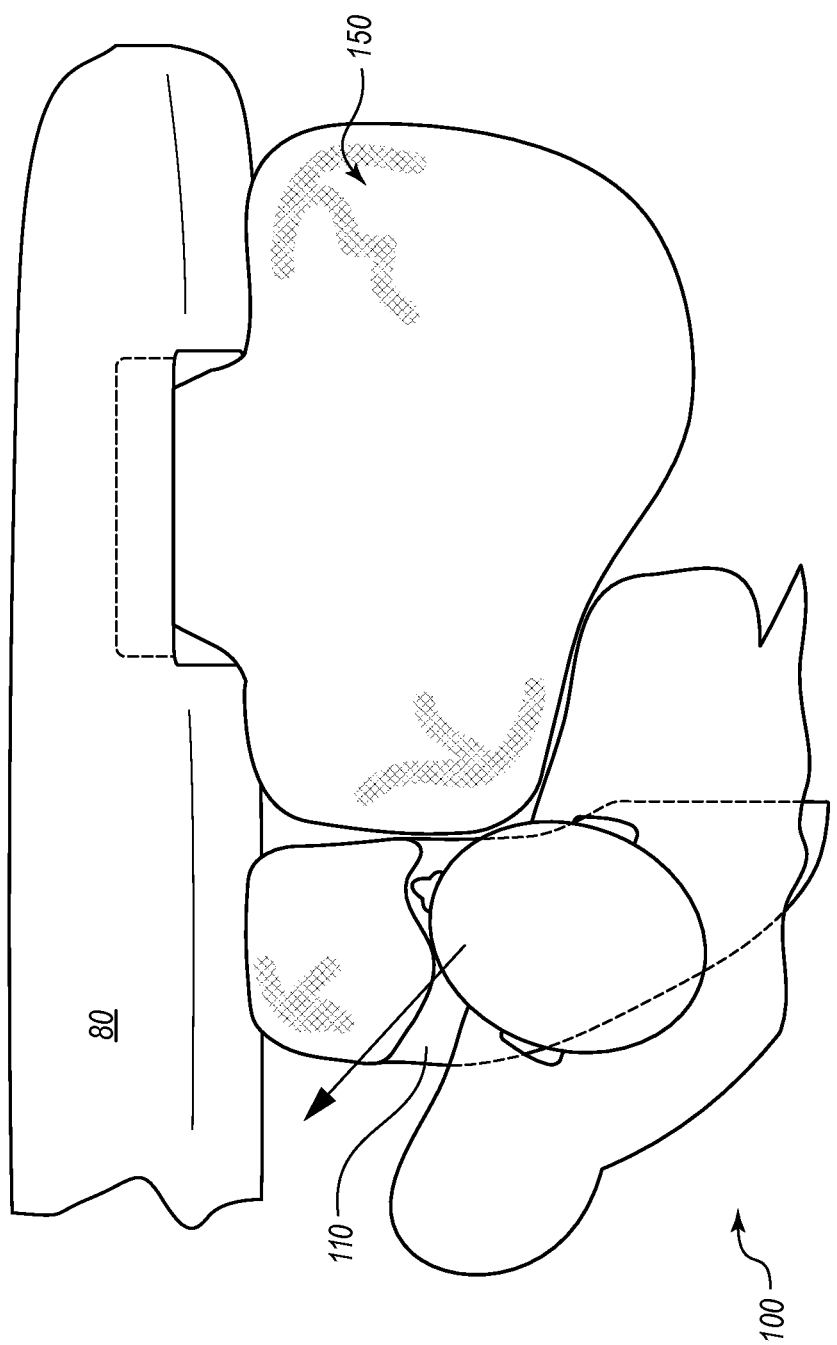
FIG. 3 is a top plan view of a portion of the vehicle of FIG. 1A depicting a subsequent position of the vehicle occupant, as compared to FIG. 2, wherein an airbag cushion disposed inboard of the passenger airbag cushions the vehicle occupant.

FIG. 3 depicts the vehicle occupant 70 at a later stage of interaction with the passenger airbag 150 and the deployed airbag assembly 100. In FIG. 3, the torso of the occupant 70 has only partially engaged with the passenger airbag 150, while another portion of the torso has either deflected off of or bypassed the passenger airbag 150 to engage the airbag cushion 110, due to the occupant movement in the oblique direction 90 (i.e., oblique relative to the forward direction). The head of the occupant 70 is also shown being received by the airbag cushion 110. In some instances, contact with an inboard region of the passenger airbag 150 may cause the head of the occupant 70 to rotate in an outboard direction (e.g., toward the passenger door). The airbag cushion 110 may reduce or prevent such rotational movement, which might otherwise result in or contribute to kinematic rotational brain injury.

In some collision scenarios, the occupant may not be restrained by a seatbelt. In other collision scenarios, the shoulder restraint portion of a seatbelt 54 (see FIG. 1A) may slip off the shoulder of the occupant 70 due to the oblique movement of the occupant 70. With little or no restraint provided by the seatbelt 54 to inhibit the movement of occupant 70 along an oblique trajectory, it may be particularly desirable for the airbag cushion 110 to be configured to at least partially cushion an occupant 70 that bypasses the passenger airbag 150.

In the illustrated embodiment, the head and left shoulder of the occupant 70 are protected from harmful contact with the dashboard 80 by the airbag cushion 110. In other instances, the airbag cushion 110 may protect other regions of the occupant's body due to the nature of the collision; the size, shape, and/or initial position of the occupant 70; the configuration of the airbag cushion 110; etc. In some embodiments, the airbag cushion 110 is configured to primarily cushion the head of the vehicle occupant 70.

In some embodiments, the airbag cushion 110 can allow for narrower front airbags, which may reduce the amount of inflation gas required to deploy the front airbags. The reduction in the amount of inflation gas needed to deploy the front airbags may allow the front airbag(s) to be filled more rapidly and/or allow for the use of smaller inflators. In other or further embodiments, a configuration that uses both a front airbag and an airbag deployed adjacent a seat base may decrease the total volume of inflation gas that is needed fill airbags to cover the dashboard 80.

Figure 4:
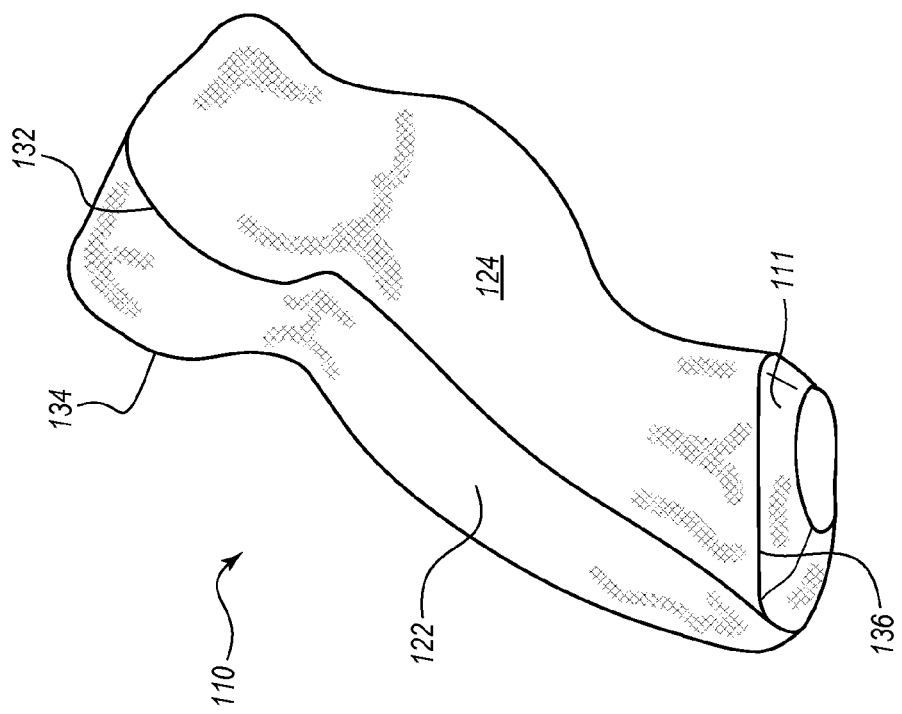
FIG. 4 is a perspective view of one of the expanded airbag cushions depicted in FIG. 1B.

FIG. 4 provides a perspective view of the airbag cushion 110 in an expanded state. The airbag cushion 110 may comprise any suitable shape and configuration and may be manufactured in any suitable manner. In the illustrated embodiment, the airbag cushion 110 comprises a central panel 122 and two side panels 124 (only one of which may be seen in the view provided), and a throat 111. In the embodiment disclosed in FIG. 4, a first side panel is joined to the central panel 122 along a first seam 134. A second side panel 124 is joined to the central panel 122 along a second seam 132. The second side panel is also joined to the throat 111 along a third seam 136. Seams 132, 134, 136 may be of any suitable variety, whether sealed or unsealed seams, and may be formed via stitching, one or more adhesives, taping, welding (e.g., radio frequency welding), heat sealing, or any other suitable technique or combination of techniques. The side panels 124 may be joined together along a forward seam 136 or may each be joined to a forward pane (not shown) along forward seams 136 (only one of which may be seen in the view provided).

The panels may be formed of any suitable material. For example, in some embodiments, panels are formed of woven nylon fabric. Moreover, a variety of types and configurations of airbag panels can be utilized in various embodiments. For example, the size, shape, proportions, and connectivity of the panels may vary in different embodiments. Some embodiments may be tailored for use in different vehicles and/or for different locations within a vehicle. For example, the central panel 122 may comprise a width that is selected based on any suitable criteria, such as the distance between a deployed passenger airbag and a deployed driver airbag or the width of a center console.

The side panels 124 may also be shaped and dimensioned in a variety of ways. For example, the side panels 124 may be shaped and coupled to a housing such that, when deployed, the airbag cushion 110 extends primarily in an upward and forward direction. In some embodiments, the geometric center of the airbag cushion 110 is disposed one or more of inboard of, vertical of, and forward of the housing. Like the side panels, other dimensions of the airbag cushion 110 may also be selected to permit suitable coverage of potentially injurious portions of the vehicle, such as the center console or other portions of the dashboard 80.

The throat 111 of the airbag cushion 110 may be configured to couple to a housing and/or inflator disposed within and/or adjacent to a seat base. The throat 111 may comprise an opening through which inflation gas may pass to inflate the airbag cushion 110. In other embodiments in which an airbag cushion is configured to be deployed from a bucket seat positioned on the left side of the vehicle (e.g., the driver seat), the throat may join the with the first panel (not shown) instead of the second panel.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising:
a housing configured to be mounted at or below a seating surface of a seat of a vehicle;
an inflator; and
an airbag cushion that is configured to:
receive inflation gas from the inflator to expand the airbag cushion from a compact state within the housing to a deployed state;
deploy from the housing and inboard of the housing when the housing is mounted at or below the seating surface of the seat;
cover a portion of a dashboard, wherein the portion of the dashboard is disposed adjacent a front airbag when the front airbag is in a fully deployed state; and
receive one or more of a head or torso of a vehicle occupant when the vehicle occupant moves from a vehicle occupant region in a direction that is oblique relative to the forward direction.

2. The airbag assembly of claim 1, wherein the airbag cushion is configured to contact the front airbag when both the front airbag and the airbag cushion are fully deployed.

3. The airbag assembly of claim 1, wherein the airbag cushion, when fully deployed, comprises a geometric center that is disposed inboard of, vertical of, and forward of the housing.

4. The airbag assembly of claim 1, wherein the airbag cushion, when fully deployed, is disposed such that a space directly between an inboard shoulder of a passenger and an inboard shoulder of a driver is not occupied by the airbag cushion.

5. The airbag assembly of claim 1, wherein the airbag cushion is configured to cover a portion of the dashboard that is not covered when both a front driver airbag is fully deployed and a front passenger airbag is fully deployed.

6. The airbag assembly of claim 1, wherein the airbag cushion is configured to deploy from the housing primarily in a direction that is both upward and forward.

7. The airbag assembly of claim 1, wherein the housing is mounted to the seat.

8. The airbag assembly of claim 1, wherein the seat of the vehicle comprises a seat base, and wherein the seat base comprises a rigid frame and the housing is mounted to the rigid frame.

9. An airbag assembly comprising:
a housing configured to be mounted adjacent to a seat base of a vehicle;
an inflator; and
an airbag cushion that is configured to:
receive inflation gas from the inflator to expand the airbag cushion from a compact state within the housing to a deployed state;
deploy from the housing and inboard of the housing when the housing is mounted adjacent the seat base of the vehicle; and
cover a first region of a dashboard that is disposed lateral to a second region of the dashboard, wherein the second region is covered by a front airbag when the front airbag is deployed.

10. The airbag assembly of claim 9, wherein the housing is configured to be mounted to a bucket seat.

11. The airbag assembly of claim 9, wherein the airbag cushion is configured to receive a head of a vehicle occupant when the vehicle occupant moves from the vehicle occupant region in a direction that is oblique relative to the forward direction.

12. The airbag assembly of claim 9, wherein the airbag cushion, when deployed, comprises a geometric center that is disposed inboard of, vertical of, and forward of the housing.

13. The airbag assembly of claim 9, wherein the airbag cushion, when fully deployed, does not intersect a line segment that runs from an inboard shoulder of a crash test dummy that is seated in a driver seat in a vehicle occupant region to an inboard shoulder of a crash test dummy that is seated in a passenger seat in a vehicle occupant region.

14. The airbag assembly of claim 9, wherein the airbag cushion, when fully deployed, does not intersect a line segment that runs from a thoracic vertebra of a crash test dummy that is seated in a driver seat in a vehicle occupant region to a thoracic vertebra of a crash test dummy that is seated in a passenger seat in a vehicle occupant region.

15. The airbag assembly of claim 9, wherein the airbag cushion is configured to deploy from the housing primarily in a direction that is both upward and forward.

16. An airbag system comprising:
   a front airbag assembly to deploy to cover a first portion of a dashboard of a vehicle, the first portion of the dashboard disposed forward a front occupant of a vehicle; and
   a center airbag assembly comprising:
      a housing configured to be mounted at or below a seating surface of a seat of a vehicle;
      an inflator; and
      an airbag cushion that is configured to
         receive inflation gas from the inflator to expand the airbag cushion from a compact state to a deployed state;
         deploy from the housing and inboard of the housing when the housing is mounted at or below the seating surface of the seat;
         cover a second portion of a dashboard, wherein the second portion of the dashboard is disposed adjacent the first portion of the dashboard; and
         receive one or more of a head or torso of a vehicle occupant when the vehicle occupant moves from a vehicle occupant region in a direction that is oblique relative to the forward direction.

17. The airbag assembly of claim 16, wherein the front airbag assembly deploys from a housing mounted within the dashboard.

18. The airbag assembly of claim 16, wherein the housing of the center airbag assembly is mounted to the seat of the vehicle.

* * * * *